US 6,629,317 B1

United States Patent
Kirschner et al.

(10) Patent No.: US 6,629,317 B1
(45) Date of Patent: Sep. 30, 2003

(54) METHOD FOR PROVIDING FOR PROGRAMMING FLASH MEMORY OF A MAILING APPARATUS

(75) Inventors: Wesley A. Kirschner, Hamden, CT (US); Louis J. Loglisci, Stamford, CT (US); George T. Monroe, Seymour, CT (US); Richard A Rudolph, Newington, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/364,081

(22) Filed: Jul. 30, 1999

(51) Int. Cl.$^7$ .............. G06F 9/445; G06F 9/44; G06F 12/00; G06F 17/00

(52) U.S. Cl. .............. 717/175; 717/169; 711/103; 705/500

(58) Field of Search .............. 717/100, 168–178, 717/129; 711/103, 173, 203; 710/10; 713/2; 705/400–416, 500; 235/101

(56) References Cited

U.S. PATENT DOCUMENTS

| | | | | |
|---|---|---|---|---|
| 5,432,927 A | * | 7/1995 | Grote et al. .............. | 713/2 |
| 5,621,738 A | | 4/1997 | Caywood et al. .......... | 714/721 |
| 5,652,886 A | * | 7/1997 | Tulpule et al. ............ | 713/2 |
| 5,682,497 A | * | 10/1997 | Robinson .............. | 711/103 |
| 5,717,887 A | * | 2/1998 | Leslie .............. | 717/173 |
| 5,737,265 A | | 4/1998 | Atwood et al. ........ | 365/185.03 |
| 5,809,558 A | * | 9/1998 | Matthews et al. .......... | 711/173 |
| 5,819,108 A | * | 10/1998 | Hsu et al. .............. | 710/10 |
| 5,943,692 A | * | 8/1999 | Marberg et al. .......... | 711/203 |
| 6,134,628 A | * | 10/2000 | Hamadani .............. | 711/103 |
| 6,219,828 B1 | * | 4/2001 | Lee .............. | 717/129 |
| 6,272,586 B1 | * | 8/2001 | Roohparvar et al. ....... | 711/103 |
| 6,279,153 B1 | * | 8/2001 | Bi et al. .............. | 717/171 |

OTHER PUBLICATIONS

Komoto–Grundmann, Designing with Flash Memory in Windows CE Applications, Jun. 1998, Intel Corporation, http://www.cetj.com/archives/9806/9806desi.shtml.*

* cited by examiner

Primary Examiner—Hoang-Vu Antony Nguyen-Ba
(74) Attorney, Agent, or Firm—Angelo N. Chaclas; Charles A. Malandra; George M. Macdonald

(57) ABSTRACT

A method providing for programming reprogramming at least some software into flash memory of a postage machine or other mailing apparatus. The method calls for providing the software to be programmed into the flash memory in at least two builds, with one build providing kernel software that includes the functionality needed for programming/reprogramming (including functionality for linking to a personal computer by which the software to be programmed may be provided), and the other build providing non-kernel software, usually routines providing application-oriented functionality, and not essential to programming the flash memory. The first build, of the at least two builds, is written into sectors of the flash memory that are then locked. The system provides, in some applications, for writing the non-kernel software using a paging algorithm that writes several sectors worth of non-kernel software at a time. Once the programming of the kernel software is completed, at least part of the flash memory, the part hosting the non-kernel software, can be programmed or reprogrammed using the functionality provided by the kernel software. In some applications, three builds are provided, with a bare minimum of kernel software, including only a subset of flash programming utilities and routines providing for a basic serial I/O link for linking to a personal computer. In such an application, all of the operating system software, i.e. the software providing for system-level functionality of the mailing machine, is provided as a second, non-protected build, and a third build is provided including application software.

7 Claims, 8 Drawing Sheets

METHOD FOR PROVIDING FOR PROGRAMMING FLASH MEMORY OF A MAILING APPARATUS

TECHNICAL FIELD

The present invention pertains to the field of postage meters and other mailing equipment. More particularly, the present invention pertains to programming flash memory used in mailing equipment.

DESCRIPTION OF RELATED ART

Referring to FIG. 1A, a mailing apparatus 13, such as a postage meter 17 shown in FIG. 1B, often includes a microprocessor 14 having no read only memory (ROM), but having random access memory (RAM) 16 for holding program instructions to be executed by the microprocessor 14. Consequently, software, i.e. program instructions and data, can be stored in so-called flash memory 15, a type of non-volatile memory. The flash memory software to load 10 is often provided by a flash memory programmer 12 through a personal computer (PC) 11 linked to the microprocessor 14 of the mailing apparatus 13. The microprocessor 14 has a universal asynchronous receiver/transmitter (UART) (not shown), which routes the software 10 from the PC 11 to the flash memory device 15.

The flash memory software to load 10 is first loaded at the time the mailing apparatus is manufactured, and from time to time, it is desirable to change the program instructions and data in the flash memory, for example to incorporate revisions to the program instructions or to change the data used in operating the mailing equipment. The act of writing software to a flash memory is called "programming" the flash memory. A flash memory is a device providing erasable programmable read only memory containing many sectors, each sector containing a number of bytes, where each sector is separately erasable. In addition, a flash memory device is often byte programmable. Often also, flash memory is block erasable/writable, blocks being groups of bytes. Usually, a flash memory device is divided into a plurality of volumes, which are the unit-erasable quantity of memory on a given piece of hardware. A volume may be a single sector or multiple sectors of a storage space representing the capacity of the memory. Prior to writing to, or programming, a location within the memory device, the volume within which the location is found must be erased and then the whole volume is rewritten to include the programmed location. Thus, programming of a single location requires an erase cycle of the volume within which the single location is located, and a write time to rewrite the erased volume. Typical erase cycles do not take long (approximately one second), but it is possible for a typical write cycle (time to program all of flash memory of a typical mailing apparatus using flash memory) to require up to 15 minutes.

According to the prior art, the software for a mailing apparatus is loaded into the flash memory as a single build, i.e. software including routines that call each other to provide the functionality of the mailing apparatus. The routines are able to call each other, according to standard programming practice, using function calls that are compiled and made operative by linking the routines together. Referring to FIG. 2 and again to FIG. 1A, a single build as provided by the prior art is arranged in the flash memory 15 of a mailing apparatus 13, and includes power up routines 24, operating system routines 25, application software 26. Some of the flash memory is shown as unused flash memory 27.

All of the software must be written (programmed) into the flash memory for the mailing apparatus to work correctly. If a power failure interrupts the programming of the flash memory, the flash memory must be erased, and the programming of the flash memory must be started again from the beginning. When flash memory is being reprogrammed (either at a user's facility or at a manufacturing site), if power fails during the reprogramming, the mailing apparatus is completely inoperative, since it has no ROM for holding even boot-up routines. As indicated above, flash memory write cycles are often long, and reprogrammed from the beginning causes delays which are often costly.

Therefore, there is a need for a way to program flash memory of a mailing apparatus so as to avoid the long delays caused by a power failure during programming, and the subsequent restarting of the programming process.

SUMMARY OF THE INVENTION

The present invention seeks to provide a system of programming the flash memory of a mailing apparatus so that in case of a power failure during some of its programming, or in case of a need to reprogram at least some parts of the flash memory, only part of the programming must be performed. It does this by providing a method of programming flash memory of a mailing apparatus in more than one build, with one build containing only a fraction of the software needed to impart to the mailing apparatus its full functionality, but all of the software needed to link to a PC and to reprogram at least some sectors of the flash memory (i.e. erase and write sectors of flash memory). After writing this so-called kernel software into sectors of flash memory, the sectors are locked, i.e. are prevented by software from being erased and rewritten. The other builds are written to sectors that are not necessarily locked. The invention includes embodiments differing chiefly in what software is included in the kernel software.

Accordingly, the present invention provides a method of programming a mailing apparatus, the mailing apparatus comprising a microprocessor and a flash memory, the programming amounting to writing, to sectors of the flash memory, software needed for operation of the mailing apparatus, the method comprising the steps of: providing, as one build, kernel software, including routines for programming the flash memory, creating in particular sectors of flash an image of the one build, and then locking the sectors; and providing, as at least one other, separate build, all other software, and creating an image in flash of each other build.

In some applications of the present invention, the kernel software comprises: power-up routines automatically loaded by the microprocessor at power on, these for initializing the microprocessor, for initializing communications between the microprocessor and a programming computer, for enabling the microprocessor to read and write to the flash memory; and for loading operating system software; the operating system software itself, comprising routines for providing system-oriented functionality of the mailing apparatus, and kernel application software, comprising routines for providing application-oriented functionality, including enabling the microprocessor to be used by a programming computer to reprogram the non-kernel software.

BRIEF DESCRIPTION OF THE DRAWINGS

Various features and advantages of the invention will become apparent upon consideration of the subsequent detailed description presented in connection with accompanying drawings, in which.

BEST MODE FOR CARRYING OUT THE INVENTION

Figure 1A:
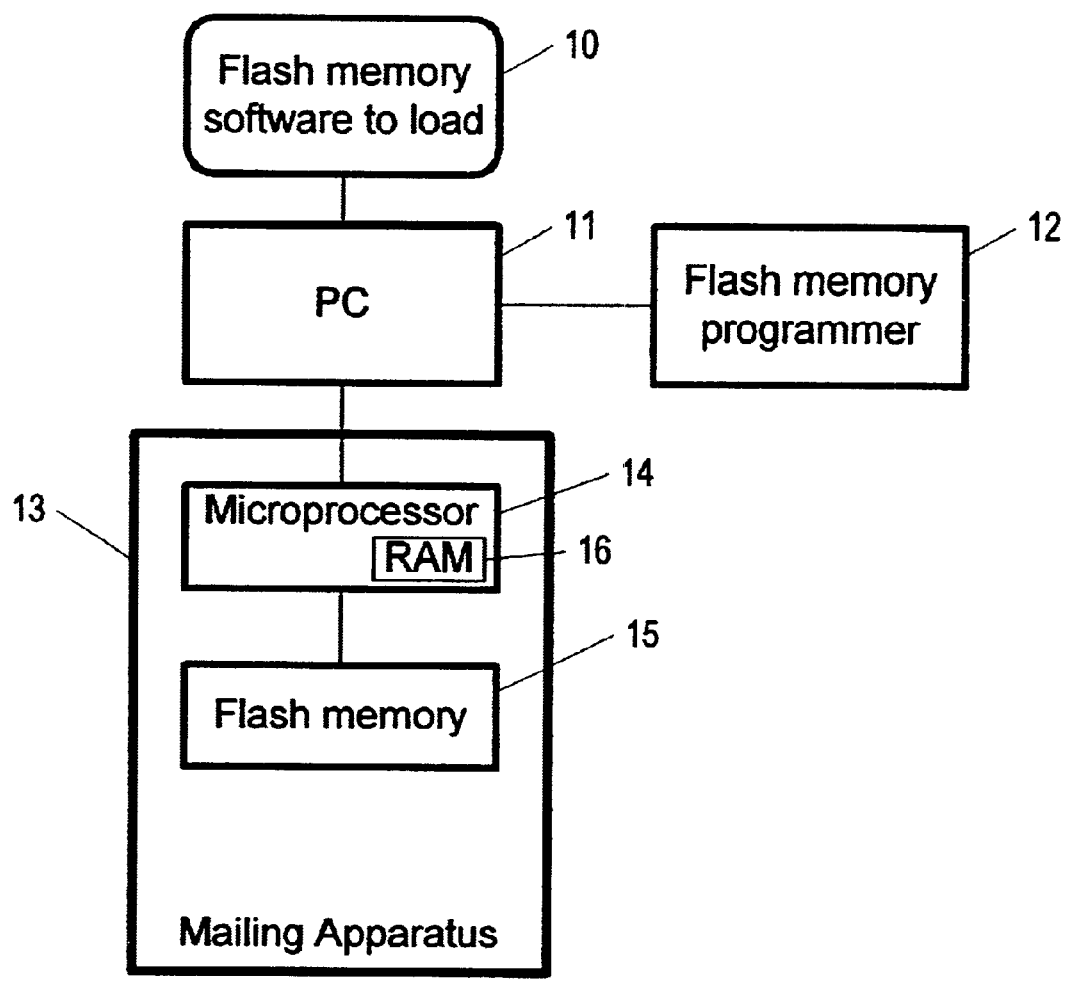
FIG. 1A is a block diagram showing programming of flash memory of a mailing apparatus built according to the prior art and according to the present invention.

Referring again to FIG. 1B, a mailing apparatus 17 in which the present invention can be incorporated includes a printer module (not shown), a conveyor apparatus (not shown), a micro control system (not shown), other modules not shown for the sake of clarity, and user interface equipment 18 including a set of function keys 20, a numeric keypad 21, a set of (non-function-type) keys 22, and a display 19, which can be a cathode ray tube (CRT), light emitting diode (LED), LCD or other kind of display. The (non-function-type) keys allow a user to indicate commands that are not directly related to processing a mail piece, such as: enter, clear, download postage, generate report, and account setup. In contrast, the function keys are concerned with actions needed to process a mailpiece, such as: start, stop, print tape, reset batch counter, weigh mode on/off, sealer/moistener mode on/off.

Figure 3:
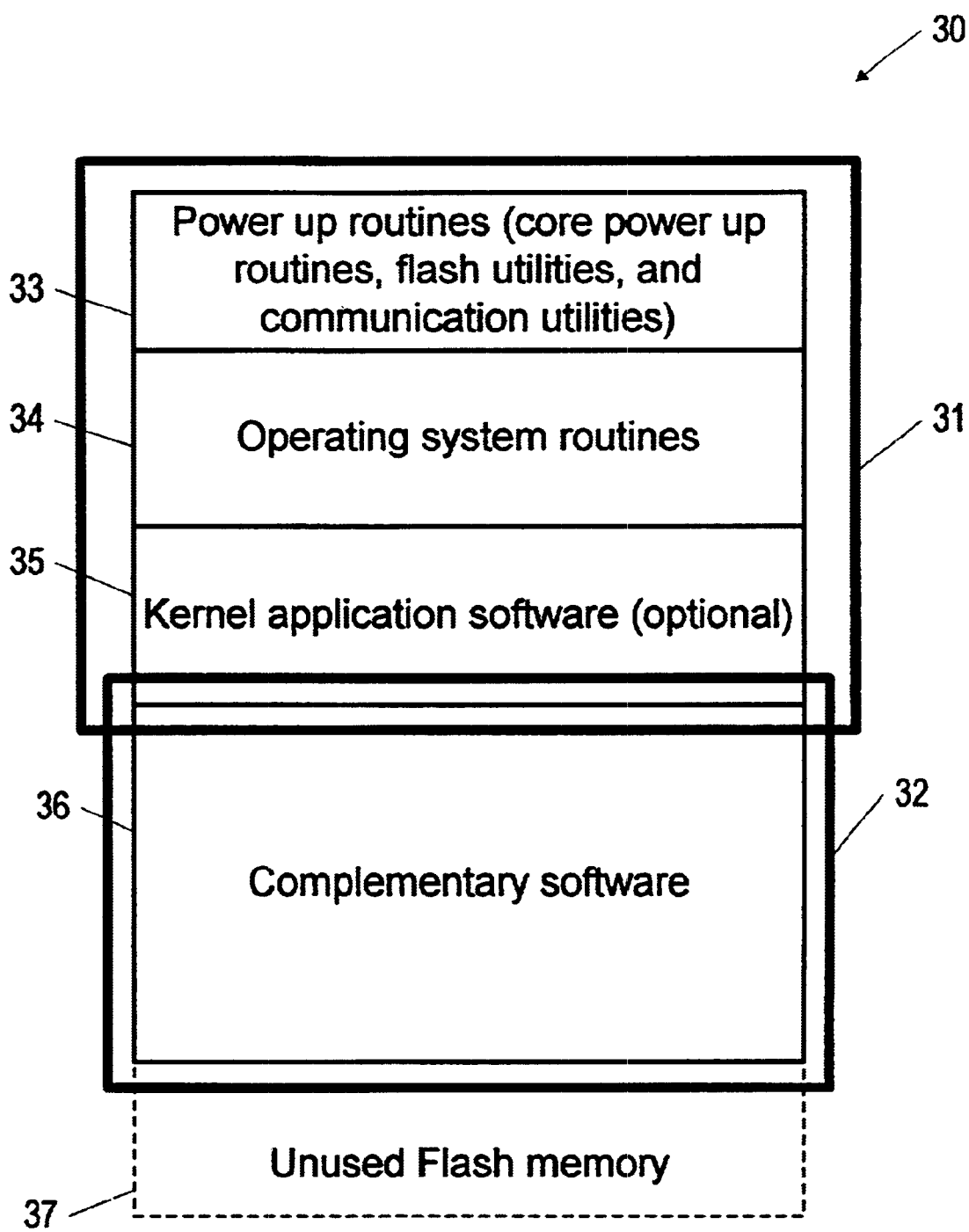
FIG. 3 is an illustration of the arrangement in a linear array of flash memory of the software written into the flash memory of a mailing apparatus, according to the present invention.

Referring now to FIG. 3, according to the present invention in one embodiment, the software for a postage meter 17 (FIG. 1B) or a mailing apparatus 13 generally (FIG. 1A) is written into flash memory 30 as two separate software builds 31,32: a first build 31 written into sectors of flash memory that are afterward locked, and so protected; and a second build 32 written into sectors of flash memory that remain non-locked, and so are unprotected.

As shown further, what is written to the locked sectors includes what is called here kernel software, i.e. software upon which essential hardware and other software depend. Thus, the kernel software typically includes: power-up routines 33, which are automatically loaded into the microprocessor at power-up, and which load the operating systems routines, and which include utilities for communicating with a PC and which enable the microprocessor to find software in the flash memory; operating system routines 34, which provide system-level functionality; and selected application software, called, here kernel application software 35. As indicated above, any reference to software is a reference to program instructions and data.

The kernel application software (build) 31 includes all functionality needed for accepting software to be loaded into flash memory from a PC, and the functionality needed to write the software into the flash memory. Besides communications functions (in the power up routines 33) and flash memory operating routines (in the operating system routines 34), the kernel application software may contain other functionality.

Still referring to FIG. 3, the second build 32, written to the non-locked sectors, is here called complementary software 36, and is usually software providing application-oriented functionality of the mailing equipment not provided by the kernel software. Such software may also included some complementary operating system routines. The complementary software is usually much larger in size than all of the protected software, i.e., all of the power-up routines in combination with the operating system routines and further in combination with the kernel application software.

The total software that would be written to the flash memory according to the prior art is exceeded in size by the software written to the flash memory according to the present invention. This is because according to the present invention routines are provided to the flash memory, in the protected sectors, that specifically enable programming of flash memory and also provide other functions and features not found in the software written in a flash memory of a mailing apparatus according to the prior art.

Figure 4:
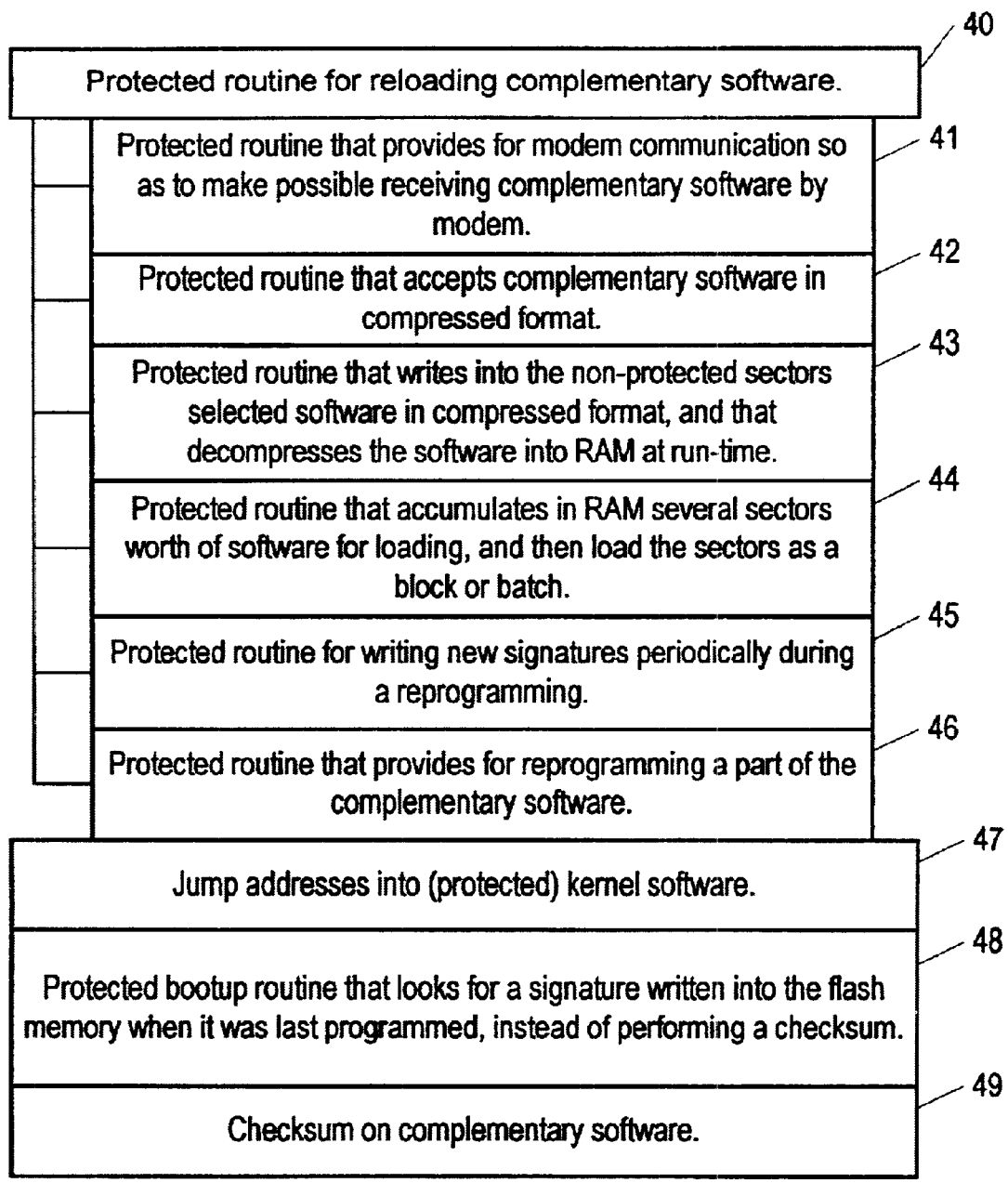
FIG. 4 is a component diagram showing software routines (utility procedures) as components of a software build programmed into the flash memory of a mailing apparatus, according to the present invention.

Referring now to FIG. 4, a method, according to the present invention, for programming the flash memory of a mailing apparatus includes, in general, providing various routines and jump tables. First, in the preferred embodiment, as already discussed, the method includes providing a protected routine 40 for reloading complementary software, such as would be required in case of a power failure in the midst of programming complementary software into the flash memory (after the kernel software is loaded). The routine 40 for reloading complementary software therefore includes, as already discussed, enabling the microprocessor 14 of the mailing apparatus 13 to communicate with the PC 11, and enabling the microprocessor to access the flash memory 15 (see FIG. 1A).

In addition, in some applications, the method includes providing various other routines 41–46 associated with reprogramming flash memory, and also includes other routines 47–49 of more general use. The other routines 41–46 associated with reprogramming flash memory include: a protected routine 41 that provides for modem communication so that the flash memory can be reprogrammed remotely; a protected routine 42 that accepts from a PC in compressed format the complementary software that is to be written to the flash memory (which is of particular advantage when some or all of the complementary software will be written to the flash memory in compressed format); a protected routine 43 that writes into the non-protected sectors of the flash memory selected software in compressed format, compressing the software if it is not already compressed, and decompressing at run-time the software into the RAM of the microprocessor; a protected routine that accumulates in the RAM of the microprocessor several sectors worth of complementary software, which it then writes as a block, or in batch mode, to the flash memory (this paging of memory images saving time because of savings in the overhead required for each new access of the flash memory); a protected routine 45 for periodically signing (usually in a non-protected sector) the flash memory during a programming of the flash memory so as to indicate the last successfully completed stage of a programming (thereby enabling referring to the signature to determine where to restart programming in case of an interruption by a power failure, instead of having to always start from the beginning); and a protected routine 46 that provides for reprogramming/revising a part of the complementary software, and, in the course of this revising, finds where in the non-locked sectors to write the revision (preferably on top of what is being revised, but if the revision is larger than what it is replacing, the routine will use a previously unused area of the flash memory).

The routines 47–49 of more general use include a table of jump addresses 47 for directing the microprocessor 14 (FIG. 1A) to call protected kernel software. In the prior art, when all of the routines for the mailing apparatus are written to its flash memory in one build, one of the routines can call a function provided by another according to standard programming practice, because the routines are linked in the process of creating the build. In the present invention, however, a routine of the complementary software is not able to call a routine written into the protected sectors of the flash memory according to standard programming practice. The jump addresses of the present invention, by which a routine in the complementary software can "call" a function provided by a protected routine (by directing that the instruction pointer of the microprocessor jump to the address in the protected sector where the routine begins), make the services of a protected sector routine available to the complementary software. Thus, with jump tables, there is no loss in functionality that results from partitioning into two builds in its flash memory software, including power-up routines, for operating a mailing apparatus. Jump tables are provided as part of each non-kernel build, as needed. In case of more than two builds, jump tables can be provided by which software in any of the non-kernel builds can invoke the services of any other build, but usually, and in the preferred embodiment described below, in which the kernel is a bare minimum, the non-kernel builds would not invoke the kernel.

In addition, because of having used, in some applications, a series of signatures to signal having successfully loaded successive increments of a build, the method of the present invention includes providing a routine 48 that, at power-up, instead of performing a checksum on the flash memory, inspects the last signature written to determine if it is the signature signaling the successful loading of the last increment. Avoiding a checksum in this way saves time at power-up, with only a small risk that the content of a flash memory is not correct because of having been altered by e.g. a cosmic ray or other disturbance.

From time to time, however, the flash memory should be inspected for an unplanned change of content, and the method of the present invention also includes, in some applications, providing a routine 49 that performs a checksum at scheduled intervals, or as directed by a user. Although the periodic signing of the flash memory does signal whether or not all of the increments of a build have been written into the flash memory of a mailing apparatus, only a checksum calculation can verify the integrity of the programming. Thus, performing a checksum calculation is advisable at least once after writing a complementary build to the flash memory.

Figure 5:
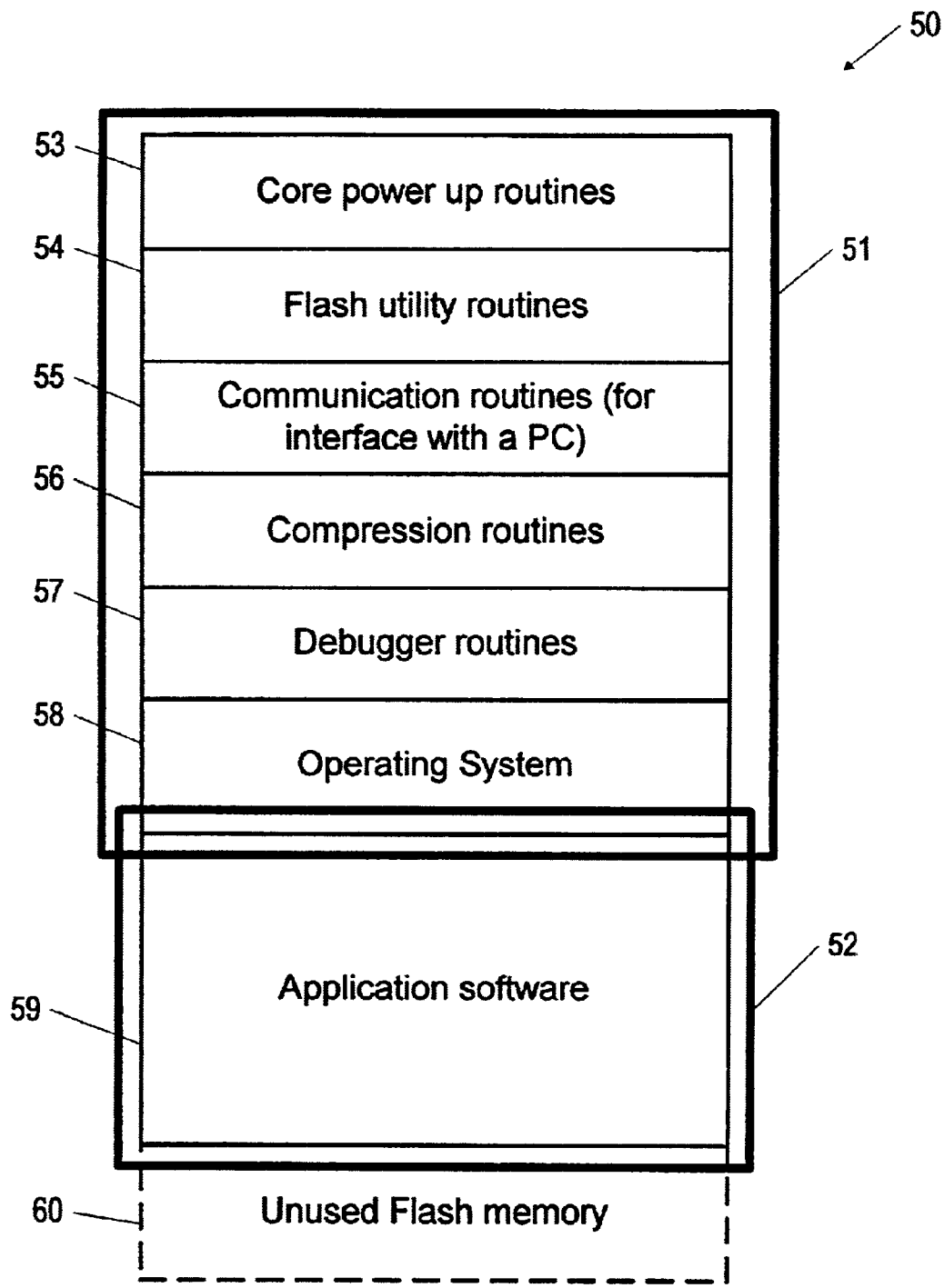
FIG. 5 is an illustration of one arrangement in flash memory of specific software provided by the present invention.

Referring now to FIG. 5, in one particular embodiment, the method of the present invention includes providing, to a flash memory 50, only two builds 51, 52, in which the first, kernel software build 51 includes: core power up routines 53, flash utility routines 54, communication routines 55 for interfacing with a PC, compression routines 56, as discussed above, but usually only for accepting, in compressed format, software to be written to flash memory and decompressing the software; debugger routines 57 for tracing errors; and operating system routines 58; but no application software. The second build 52, which is not protected, i.e. is not programmed in sectors that were subsequently locked, is application software 59. FIG. 5 shows that after the programming of the flash memory 50 with the two builds 51, 52, there can be some unused flash memory 60.

Figure 1B:
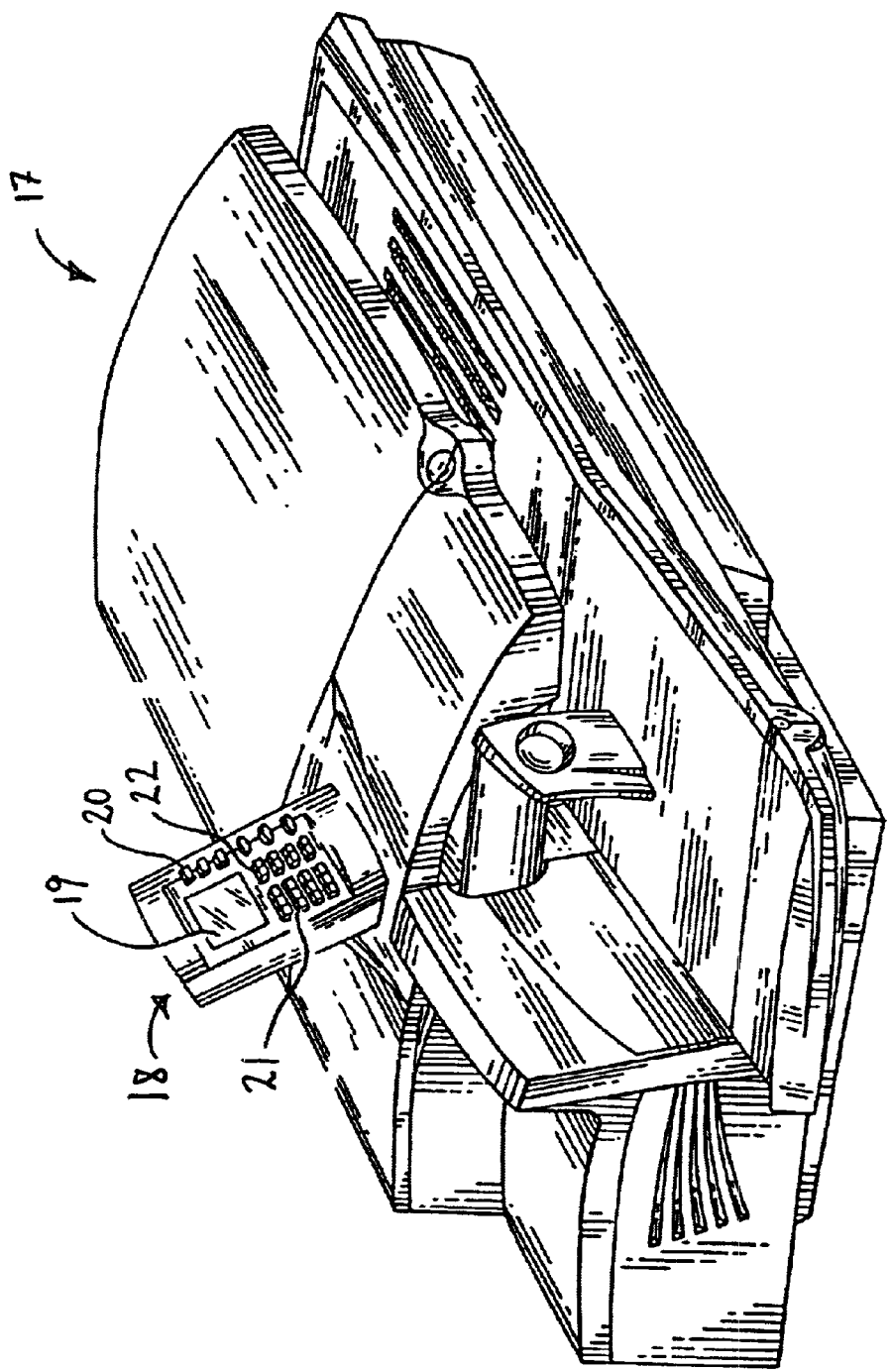
FIG. 1B is a simplified perspective view of a mailing apparatus illustrating one kind of mailing apparatus in which it is possible to incorporate the present invention.
Figure 2:
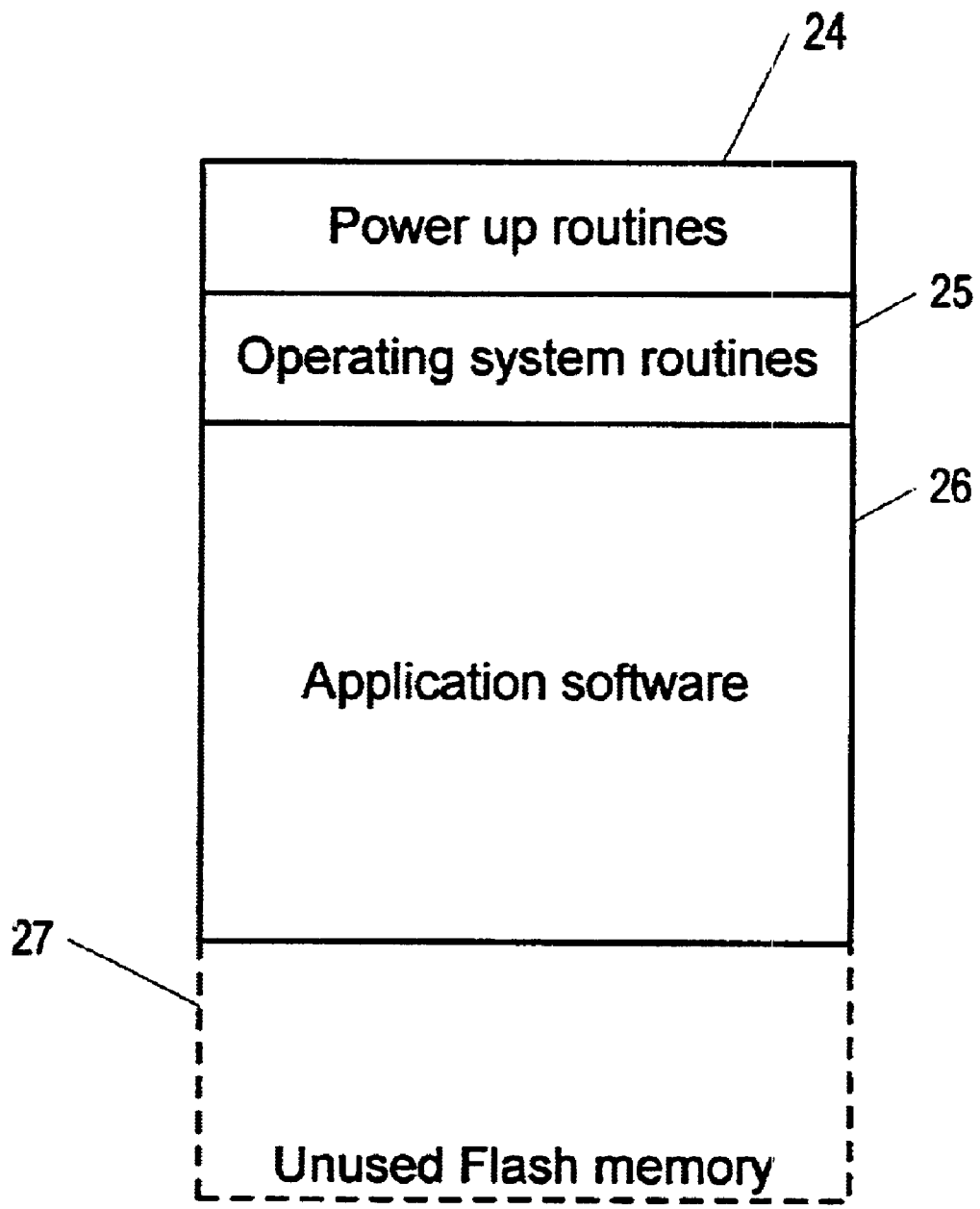
FIG. 2 is a diagram illustrating the arrangement in a linear array of flash memory of the various kinds of software written into the flash memory during programming, according to the prior art.
Figure 6:
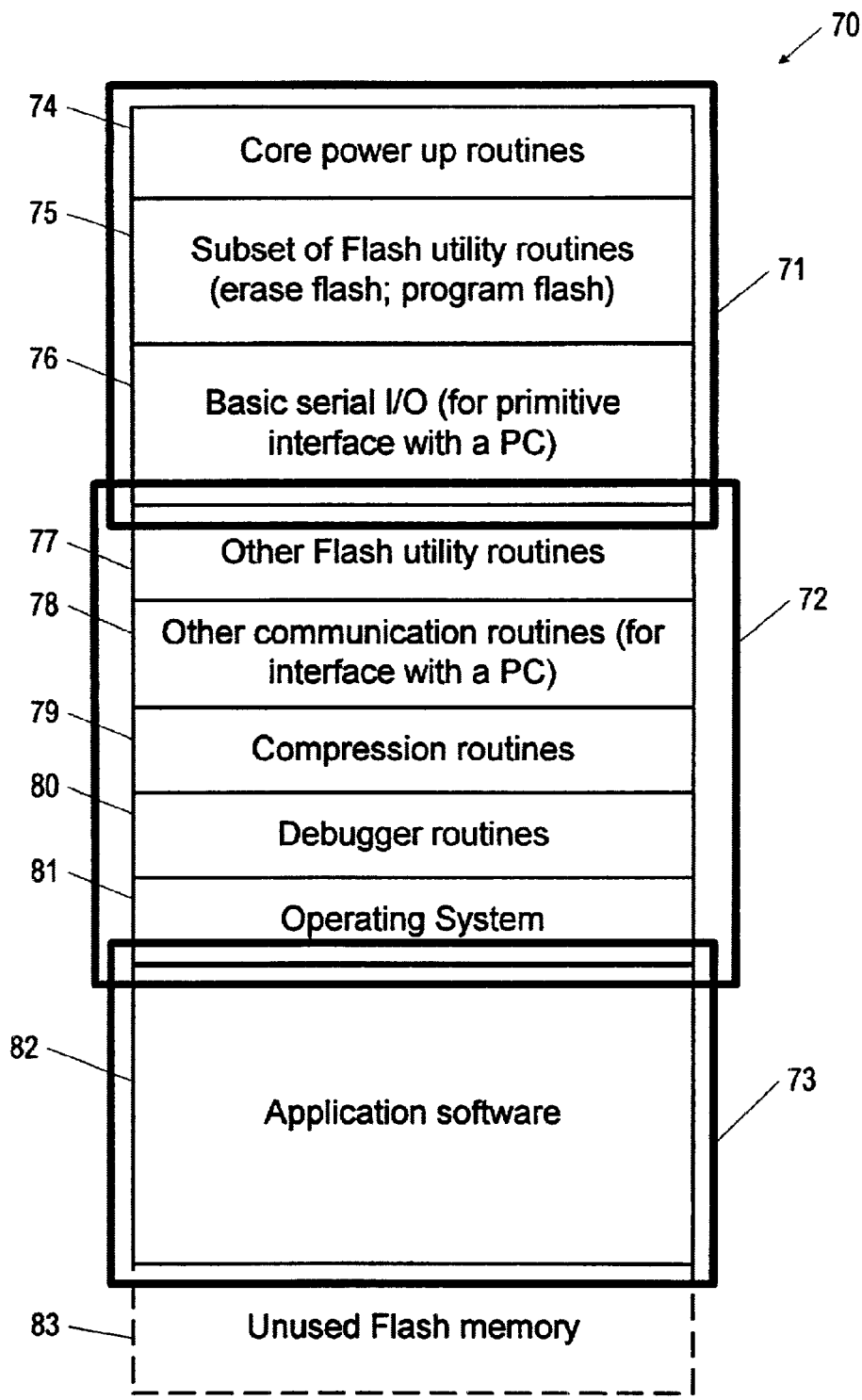
FIG. 6 is an illustration of the preferred arrangement in flash memory of specific software provided by the present invention.

Referring now to FIG. 6, in what is considered the preferred embodiment, the method of the present invention includes providing, to a flash memory 70, three different builds 71, 72, 73, in which the first, kernel software build 71 includes only: core power up routines 74; a subset 75 of all of the available flash utility routines; and basic serial I/O routines 76, providing the bare minimum needed for the PC 11 to feed software to the microprocessor 14 of the mailing apparatus 13, as shown in FIG. 1A. The time to program/write this kernel (to sectors that are subsequently locked) is significantly less (on the order of minutes) than the time to write the kernel indicated in FIG. 5.

In this embodiment, two other builds 72, 73 are provided, with neither locked, because only part of the rest of the software is particularly likely to be programmed/reprogrammed, i.e. the application software 82 of the third build 73. In this preferred embodiment, the second build 72 includes the software carved out from the kernel 51 provided by the embodiment producing the arrangement shown in FIG. 5, and therefore includes: other flash utility routines 77; other communication routines 78, beyond that providing for bare serial I/O communication with a PC; and compression routines 79, debugger routines 80, and operating system routines 81, all in content as in the embodiment corresponding to FIG. 5 (but not locked).

With this arrangement, the software that cannot be reprogrammed (the kernel software 71 in locked sectors) is kept to a bare minimum. All of the other software can be reprogrammed, but what would most likely be reprogrammed, the application software 82 is kept alone in a third build 73. Jump tables (not shown) are provided as necessary for routines in one build to invoke routines (or particular functions of routines) in another, but usually jump table need only be provided to allow the application software 82 to invoke the services of routines in the second build 72.

Figure 7:
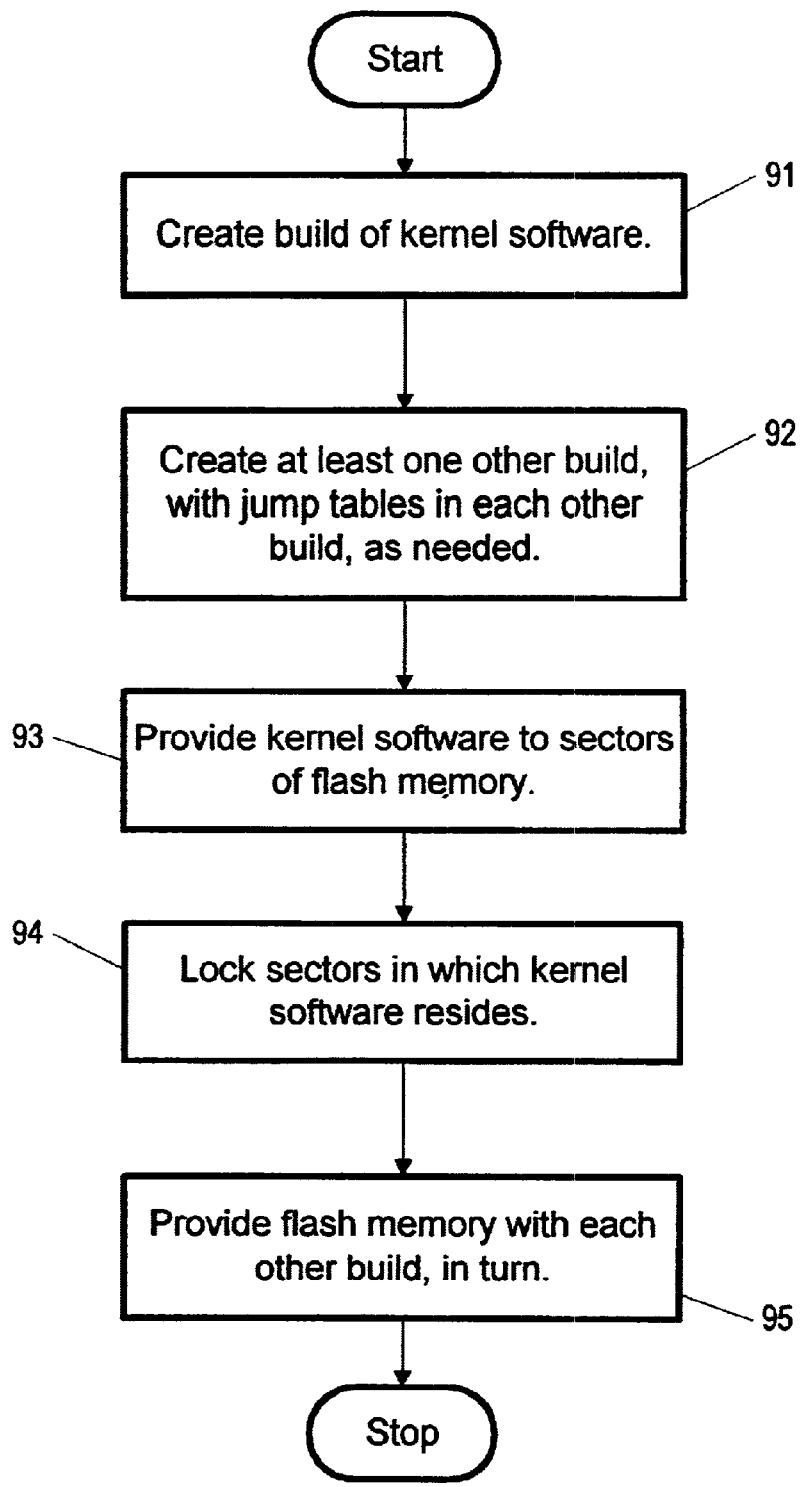
FIG. 7 is a flow chart showing the method of the present invention.

Referring now to FIG. 7, the method of the present invention is indicated generally as involving, after first having determined how to partition into separate builds all of the software for the mailing apparatus: a first step 91 of creating, as one build, the kernel software; a next step 92 of creating each other build, in turn, along with jump tables in each build, as needed, allowing the routines in the build to invoke the services of routines in other builds; a next step 93 of providing kernel software to sectors of flash memory; a next step 94 of locking the sectors in which the kernel sector resides; and a last step 95 of providing the flash memory with each other build, in turn.

In the method of the present invention, the steps involving programming the flash of a mailing apparatus, steps which are described as "providing software to sectors of flash," are to be understood as encompassing any action by which an image of software (including data) is created in flash. In other words, the present invention is not limited to programming flash using a PC 11 connected to a microprocessor 14 of a mailing apparatus 13, as shown in FIG. 1A, but includes any action resulting in the creation of an image of software in flash. The method of the present invention is not directed to how to write software to flash; it is directed only to the arrangement of what is written to flash.

It is to be understood that the above described arrangements are only illustrative of the application of the principals of the present invention. Numerous modifications and alternative arrangements may be devised by those skilled in the art without departing from the spirit and scope and the present invention, and the appended claims are intended to cover such modifications and arrangements.

What is claimed is:

1. A method of programming a mailing apparatus, the mailing apparatus including a microprocessor and a flash memory, the flash memory having a plurality of sectors, the programming performed by writing software to sectors of the flash memory, the method comprising the steps of:

providing, as one build, kernel software, including routines for programming the flash memory;

creating in particular sectors of flash an image of the one build, and then locking the sectors; and providing, as at least one other, separate build, all other software, and creating an image in flash of each other build.

2. The method of claim 1, wherein the kernel software comprises:

power up routines, for hardwired loading by the microprocessor at power on, for initializing the microprocessor, for initializing communications between the microprocessor and a programming computer, for enabling the microprocessor to read and write to the flash memory, and for loading operating system software;

said operating system software, comprising routines for providing system-oriented functionality of the mailing apparatus; and kernel application software, comprising routines for providing application-oriented functionality, including enabling the microprocessor to be used by a programming computer to reprogram the other, non-kernel software.

3. The method of claim 2, wherein the kernel software further comprises:

a routine that provides for modem communication so as to make possible receiving non-kernel software by modem;

a routine that accepts non-kernel software in compressed format;

a routine that accumulates in the microprocessor RAM several sectors worth of software for loading, and then loads the sectors as a block or batch;

a routine for writing new signatures periodically during programming; and a routine for programming a part of the non-kernel software.

4. The method of claim 3, wherein the kernel software further comprises:

a boot-up routine that looks for a signature written into the flash memory when it was last programmed, instead of performing a checksum; and a routine that performs a checksum.

5. The method of claim 4, wherein the kernel software further comprises a routine that writes into the non-protected sectors selected software in compressed format, and that decompresses the software into the microprocessor RAM at run-time.

6. A method of programming a mailing apparatus, the mailing apparatus including a microprocessor and a flash memory, the flash memory having a plurality of sectors, the programming performed by writing software to sectors of the flash memory, the method comprising the steps of:

providing, as one build, kernel software, including a subset of flash utility routines and basic serial I/O routines, creating in particular sectors of flash an image of the one build, and then locking the sectors;

providing a second build including other flash utility routines, other communication routines, compression routines, debugger routines, and operating system software, and creating an image in flash of the second build; and providing a third build consisting of application software, and creating an image in flash of the third build.

7. A method of programming a mailing apparatus, wherein the mailing apparatus includes a processor and a non-volatile memory, the non-volatile memory having a plurality of logical subdivisions, the method comprising:

receiveing kernel software as a first build, the kernel software, including routines for programming the non-volatile memory;

creating in particular logical subdivisions of the non-volatile memory an image of the first build, and then locking the particular logical subdivisions;

receiving a second build, including other software; and creating an image in non-volatile memory of the second build.

* * * * *